United States Patent Office 3,490,223
Patented Jan. 20, 1970

3,490,223
HIGH-BULK YARN OF POLYVINYL-CHLORIDE AND PROCESS FOR PREPARING SAME
Corrado Mazzolini and Francesco Denti, Mestre-Venice, Italy, assignors to Chatillon Soc. An. Ital. per le Fibre Tessili Artificiali, S.p.A., Milan, Italy, a corporation of Italy
Continuation-in-part of application Ser. No. 385,916, July 29, 1964. This application Mar. 4, 1968, Ser. No. 710,355
Int. Cl. D02g 3/02; D04h 17/00; D05c 15/00
U.S. Cl. 57—140                                    9 Claims

ABSTRACT OF THE DISCLOSURE

A novel high-bulk yarn of desirable properties is prepared by mixing fibers of polyvinylchloride of a syndiotactic index greater than 2 having a residual shrinkability in boiling water or saturated steam of between about 10% and 30% of the original length and which after being shrunk in boiling water or saturated steam have a tenacity greater than 2.5 gr./den., an elongation at break between 25% and 55%, an elastic modulus between about 20 and 40 gr./den., and a shrinkage in trichloroethylene of less than 1% at 40° C., and synthetic, artificial or natural fibers having substantially no residual shrinkability; converting the mixture into a yarn, and shrinking the yarn. The shrinkable polyvinylchloride fibers may comprise 10–70% by weight of the mixture with the preferred amount being about 30–60%. The fibers, having substantially no residual shrinkability, may be, for example, acrylic, cellulosic, or other known types, but in a preferred embodiment are polyvinylchloride fibers of high syndiotacticity having substantially the same properties as the shrinkable polyvinylchloride fibers after they have been shrunk by treatment with hot fluid.

---

This application is a continuation-in-part of our copending application Ser. No. 385,916, filed July 29, 1964, now Patent No. 3,424,833 granted Jan. 28, 1969, which discloses and claims a process for preparing fibers of polyvinylchloride of high syndiotacticity, having high shrinkability on heating and excellent mechanical characteristics after shrinking.

The present invention relates to bulk yarns made at least in part of synthetic fibers consisting of polyvinylchloride having a high syndiotactic index and stereoregularity or crystallinity, high shrinkability on heating and excellent mechanical characteristics after shrinking, as well as to a process for obtaining such bulk yarns.

The term "polyvinylchloride of high syndiotacticity or high syndiotactic index" as used in this description and in the claims, relates to (a) vinylchloride homopolymers prepared at temperatures of from −10° C. to −60° C. and having an intrinsic viscosity ($\eta$) greater than 0.7 dl./gr. and a syndiotactic index greater than about 2 (the syndiotacticity being defined by the ratio between the absorption of the infrared bands D635 cm.$^{-1}$, and D692 cm.$^{-1}$, as described by Fordham, Burleigh and Sturm, J. Polymer Sci., vol. XLI, pages 73–82, 1959) and (b) copolymers or polymer mixtures containing at least 85% by weight of vinylchloride and satisfying these conditions.

Bulk-yarns, generally known as "high bulk," prepared by using mixtures of fibers having different heat shrinkability coefficients, are already known to the textile industry.

Thus, fiber mixtures are known which partly consist of fibers of practically no heat shrinkability (i.e., below 2%), and partly of fibers with high heat-shrinkability (i.e., about 10–30%). The yarns obtained from these by the usual spinning techniques are bulked by heat treatment, mostly in boiling water or saturated steam, which cause the shrinkage of the shrinkable fibers forming the basic structure of the yarn. The unshrinkable fiber is variously crimped and raised so as to give the yarn a swollen, vaporous and bulk aspect, highly valued in the manufacture of warm, soft hosiery and looking very like natural wool.

For such a technical application it is, of course, necessary that the shrinkable fiber, as previously indicated, form the basic structure of the yarn, and that the high-bulk yarn retain good mechanical characteristics, i.e., strength and stability, so as to be able to tolerate without damage all the stresses to which the yarn is submitted both in the subsequent weaving operations and in the use of the final woven fabric.

Known fibers based on polyvinylchloride are not suited for this purpose. Such fibers do have a very high shrinkability in boiling water (above 60%), even exceeding the limit required for the application above described, but after shrinking, their mechanical characteristics fall off to extremely low values (for example, tenacity=0.8–1 gr./den.; elongation at break=120–160%; elasticity modulus=10–15 gr./den.), so that the yarns obtained from them are not in practice of much use because of the ease with which they undergo deformation, even when subjected to only a small stress.

On the other hand, it is known that it is impossible to confer to the fibers made of highly crystalline polymers (such as for instance polyamides, isotactic polypropylene, etc.) a high shrinkability coefficient in boiling water inasmuch as when these fibers are subjected to elongation by the action of heat or to cold stretching in order to cause a subsequent high shrinkability, they readily assume a stable shape, wherefore they do not appreciably differ from the same unstretched fibers.

In practice, the fibers which have given the best results with the above-mentioned bulking treatments are those of the acrylic type (Acrilan, Orlon, Dralon, etc.), which after suitable treatment may present both a high residual shrinkability and practically no shrinkage in boiling water.

We have found that fibers which shrink markedly under heat and after shrinking retain excellent mechanical characteristics may be produced from polyvinylchloride of high syndiotacticity and that these fibers are particularly suited for the production of high bulk yarns.

As already stated, it is known that by starting from the usual polymers of polyvinylchloride, fibers may be obtained which are acceptable from the textile point of view and which shrink considerably at temperatures just slightly above 60° C. but in which, after shrinking, the mechanical properties decline to extremely low values. Moreover, we have disclosed that starting from polyvinylchloride polymers with a high syndiotactic index it is possible to obtain textile fibers of very high quality which (a) may be processed on conventional textile machinery, (b) may be dry-cleaned without swelling under the action of the solvents commonly used in dry-cleaning, and (c) show an excellent dimensional stability to heat. Fibers of this type and a process for their preparation are disclosed in our copending application Ser. No. 269,257, filed Apr. 1, 1963, now Patent No. 3,388,201.

We have found that it is possible to obtain polyvinylchloride fibers of high syndiotacticity which have a residual shrinkability in boiling water of between about 10% to about 30% of their initial length, though maintaining unchanged, after being heat-shrunk, their mechanical characteristics, their dimensional stability under heat and their stability under the action of dry-cleaning solvents.

The present invention consists in high-bulk yarns processed from textile fibers comprising in part fibers of polyvinylchloride of high syndiotacticity as herein defined and with a residual shrinkability in boiling water or saturated steam between 10% and 30% of the iintial length and which after being shrunk in boiling water or saturated steam have:

(1) Tenacity: greater than 2.5 gr./den.
(2) Elongation at break: between 30% and 55%.
(3) Elastic modulus: between 20 and 40 gr./den.
(4) Shrinkage in trichloroethylene at 40° C.: less than 1%.

These shrinkable fibers based on polyvinylchloride of high syndiotactic index are particularly suited for the production of high-bulk yarns with valuable properties.

The process for obtaining such shrinkable fibers of polyvinylchloride having high syndiotactic index, consists in subjecting the fibers to a stretching additional to those stretchings normally applied in the spinning practice, and such as to ensure to the fiber the retention of the shrinkability which has thus been imparted to it. The shrinkability which is obtained according to this invention is stable at temperatures below about 50° C., but is completely removed by a simple treatment in boiling water, saturated steam or in any other suitable heating medium at such temperature.

According to one preferred method for obtaining the shrinkable fibers used in this invention, given as an example, a solution of polyvinylchloride of a high syndiotactic index is extruded through a spinneret into a suitable coagulation bath or into an evaporative atmosphere in which the spinning solvent is eliminated. The fibers thus obtained are subjected to hot stretching at a draw-ratio of at least 7, to finishing, drying and thermal conditioning (all under stretch). The fibers are then relaxed and subjected to an additional stretch treatment at a temperature above 100° C. The treatments before the additional stretch are made in order to improve the mechanical and dimensional characteristics. Reference is made to the aforementioned copending application Ser. No. 269,257 for detailed disclosure of such treatments.

For the additional stretch treatment machines of the type used by the textile industry for the transformation of "tows" into "tops," such as for instance the "Turbo-Stapler," the "Seydel" or the Tematex Converter may be used.

The "top" thus obtained possesses the surprising combination of high-heat shrinkability with high physical and mechanical characteristics which even more unexpectedly remain undiminished, even after heat-shrinking.

According to another preferred method of obtaining shrinkable fibers for use in this invention, the fibers obtained from a solution of polyvinylchloride of high syndiotactic index by dry or wet spinning, are subjected to a further heat stretching treatment during the spinning run, so that they have already at the outlet of the spinning machine a high heat-shrinkage so that they may be cut directly into staple of high shrinkage or be processed into high shrinkage tops.

According to this method the fibers, obtained for example by wet spinning of a solution of polyvinylchloride of high syndiotactic index, e.g., in cyclohexanone into a coagulating bath, are washed, heat-stretched at a stretch ratio between 4 and 7, finished and dried, before the additional heat-stretching is carried out. The additional stretching may be carried out at a stretch ratio of more than 1.1 and up to the maximum allowed by the resistance of the tow and at temperatures between 100° C. and 180° C. and preferably between 120° C. and 140° C.

After the additional stretching the fibers may be cooled down under tension, e.g., by means of cold air jets between two sets of rollers turning at the same speed, then crimped at a temperature below 50° C.

The fibers obtained by the above method may be directly worked on machines of the type similar to, for instance, the Pacifico Converter or Reiter Converter, in order to obtain high-shrinkage "tops."

The methods as above described, may be applied to all spinning counts comprised between 1 and 40 den./filaments, both for raw and pigmented (dyed) fibers.

The shrinkability is constant provided the fiber is not subjected to temperatures higher than 50–60° C., as shown in the accompanying drawing in which.

Figure 1:
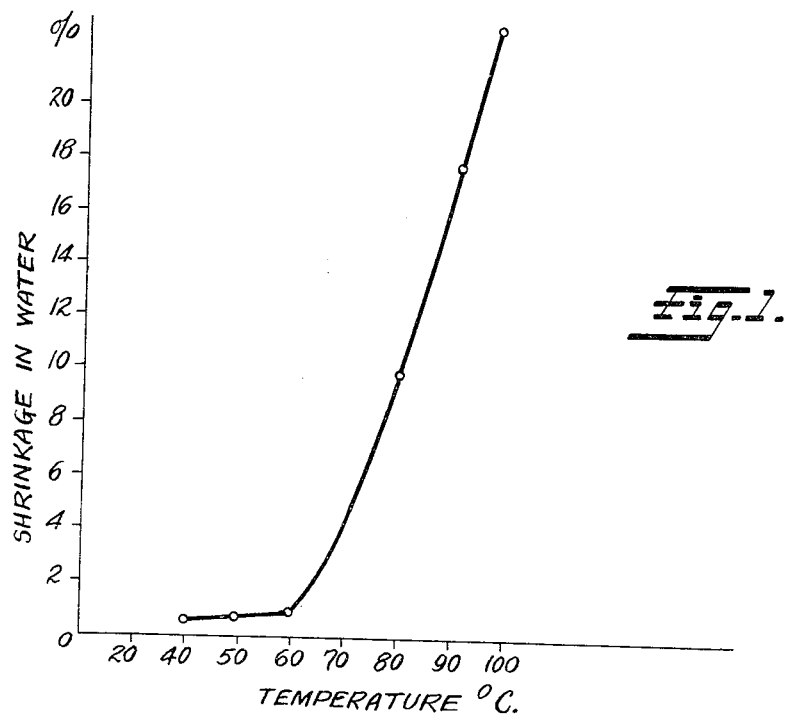
FIGURE 1 represents the behavior in water at various temperatures for an immersion time of 30 minutes of the fiber consisting of polyvinylchloride at high syndiotactic index and having high shrinkability.
Figure 2:
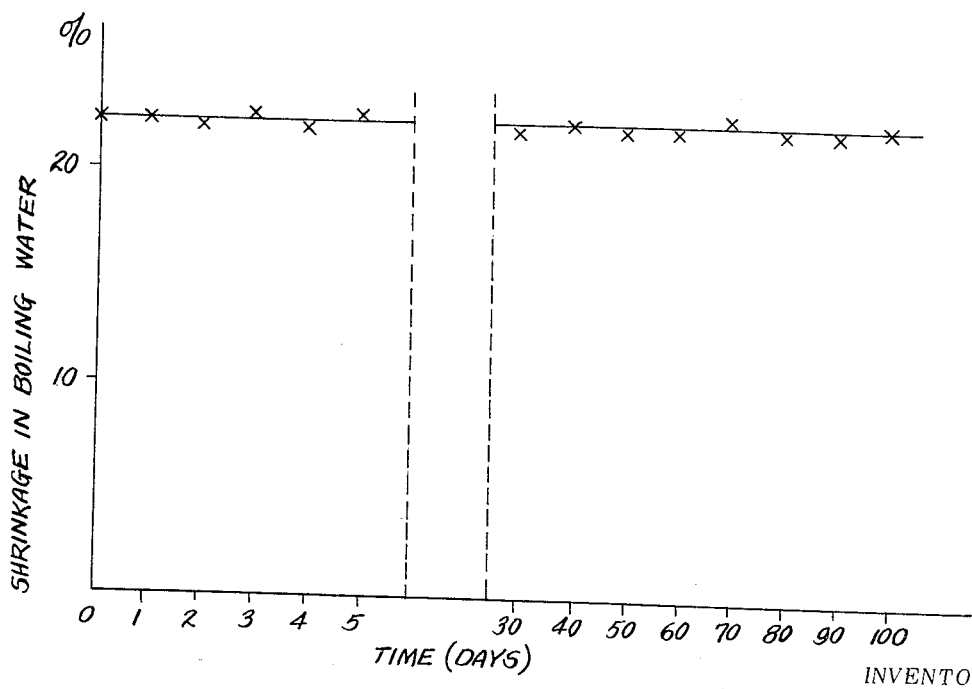
FIGURE 2 represents the behavior in boiling water of the same fiber.
Figure 2:
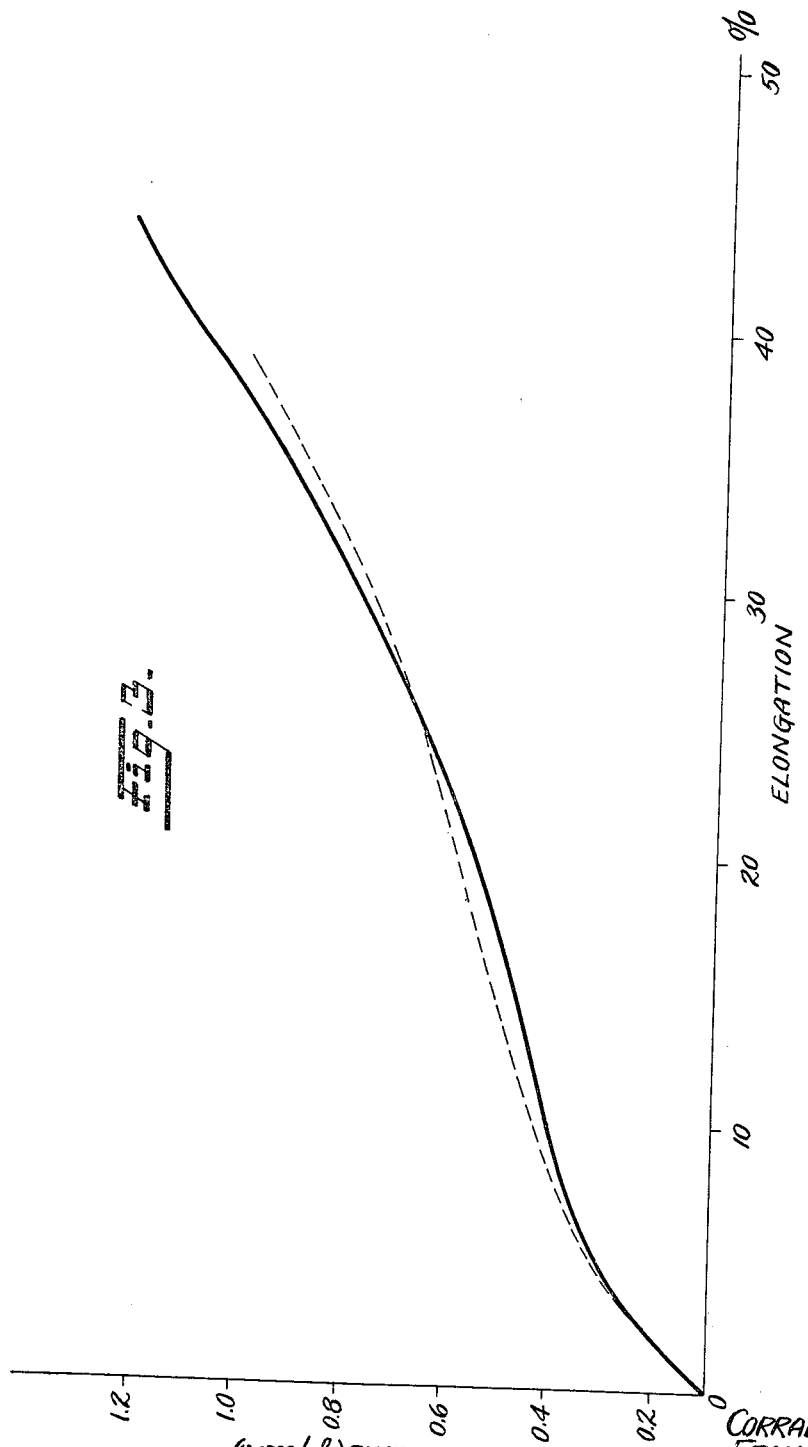

FIGURE 3 of the drawing shows the stress-strain curves of the fiber obtained according to Example 1 (see below).

For textile fibers comprised between 1 and 8 den./filament, the characteristics of each filament after being shrunk in boiling water are preferably the following:

Tenacity: 2.8–3.5 gr./den.
Elongation at break: 30–50%.
Elasticity modulus: 25–40 gr./den.

By mixing in proper amounts the staple or top of high shrinkability as described above according to the invention with another staple or top having lower or no shrinkability and consisting either of fibers of polyvinylchloride of high syndiotacticity index, or of other natural, artificial or synthetic fibers, regular yarns are obtained that if shrunk (e.g., in boiling water, steam or other proper heating means) become bulky and assume as a good appearance and soft handle like those of wool yarns.

Preferably between 10 and 70% of the fiber according to the invention (e.g., 30–60%) are used in such a mixture.

Said yarns present excellent mechanical properties, can be dyed at boiling temperature with dispersed dyes (also in the presence of carriers) and can be dry-cleaned.

Furthermore the presence of fibers of polyvinyl chloride of high syndiotactic index imparts to the yarn the property of non-propagation of flame. This is valuable in mixtures with cellulosic or acrylic fibers.

The following examples are given to more particularly describe the invention.

EXAMPLE 1

100 parts of polyvinylchloride, obtained by polymerizing vinylchloride at −40° C. and having an intrinsic viscosity $(\eta) = 1.35$ dl./g., were dissolved in 450 parts of cyclohexanone.

The solution obtained was extruded through a spinneret with 10,000 holes of $125\mu$ diameter, into a coagulum bath consisting of a mixture of cyclohexanone, water and ethyl alcohol.

The tow obtained from the coagulum bath was washed in a box containing a water-alcohol solution and stretched in boiling water at a stretch ratio of 7.5.

After stretching, the tow was treated in a box containing a finishing bath with antistatic property (Antistatic PB produced by Lamberti-Albizzate-Varese-Italy) and then dried on rollers at 135° C.

After drying the tow was heat set under tension at 200° C. in the presence of superheated steam for 6 seconds and then collected in perforated containers, which were treated in an autoclave at about 115–125° C. in the presence of saturated steam for about 30 minutes. A tow was obtained having a total titer of 33,000 den.

On combining 10 of such tows, a tow was obtained having titer 330,000 den. and was processed at the Turbo Stapler in the following conditions:

| | |
|---|---|
| Feed speed _____ m./minute__ | 20 |
| Stretch ratio _____ | 1.3 |
| Stretch temperature _____° C__ | 150 |
| Tear stretch ratio _____ | 3.20 |
| Nominal cut _____inches__ | 6 |

About 10 kilograms of Turbo tops (i.e., the tops obtained from the Turbo Stapler) were produced and 4.5 kilograms of this were relaxed in an autoclave at 115° C. in the presence of steam for about 20 minutes and mixed with the remaining 5.5 kilograms of non-relaxed Turbo tops.

The mixture of the two Turbo tops thus obtained was successively processed on traditional textile machinery and converted into yarn with metric titer 27/2 and with twist 340Z+220S.

The yarn was sequentially hank shrunk in a hank-dyeing chamber in boiling water for about 30 minutes and thereafter centrifuged and dryed.

With this treatment the yarn shrank about 23% and bulked.

The characteristics of the bulk yarn are compared with the characteristics of a similar high-bulk yarn of acrylic fiber in Table 1.

TABLE 1

|  | High-bulk yarn of high syndiotacticity PVC | High-bulk yarn of commercial acrylic fiber |
| --- | --- | --- |
| Tenacity (g./den.) | 1.13 | 0.83 |
| Elongation at break, percent | 44 | 38 |
| Elastic modulus (g./den.) | 4.6 | 4.8 |
| Specific apparent volume (ml./g.) | 2.8 | 2.75 |

The measurement of the specific volume of the yarn was carried out according to the process described by J. B. Hamilton in J. of Textile Institute of October 1961, p. 557, with a winding tension of 0.1 gr./den., a winding angle of 3° and a compression strength of 28.5 gr.

In FIGURE 3 are given the corresponding stress-strain curves obtained at the Instron dynamometer, in which the continuous curve relates to a polyacrylonitrile having the same bulkiness.

EXAMPLE 2

100 parts of polyvinylchloride obtained by polymerization of vinylchloride at −40° C. and having an intrinsic viscosity ($\eta$) of 1.30 dl./g. were dissolved in 450 parts of cyclohexanone. The solution was extruded through a spinneret with 10,000 holes of 125$\mu$ diameter into a coagulum bath as described in Example 1.

The tow obtained was washed and stretched in boiling water with a stretch ratio of 6 and subsequently finished and dried on heated rollers.

After drying the tow was stretched again with a stretch ratio of 1.35 in a room into which superheated steam was injected at 145° C. The tow was then cooled with cold air, under tension, on cold rollers and finally crimped at room temperature and cut.

The staple obtained had the following characteristics:

| Titer | den./hava | 2.5 |
| Tenacity | gr./den | 3.85 |
| Elongation at break | percent | 14.5 |
| Elastic modulus | gr./den | 48 |
| Yield tenacity | gr./den | 0.9 |
| Shrinkage in boiling water | percent | 25 |

The mechanical characteristics of the fiber itself after shrinkage in boiling water were:

| Titer | den./filament | 3.1 |
| Tenacity | gr./den | 3.32 |
| Elongation at break | percent | 46 |
| Elastic modulus | gr./den | 36 |
| Yield tenacity | gr./den | 0.61 |
| Shrinkage in boiling water | percent | 0 |
| Shrinkage in trichloroethylene at 40° C. | percent | 0 |

The staple (before shrinkage in boiling water) was then mixed with polyvinylchloride fibers of high syndiotactic index having practically no shrinkage in the ratio of 45% of high shrinkage fibers and of 55% of fibers with no shrinkage.

The mixture thus obtained was then passed through a worsted wool cycle treatment until the following characteristics were obtained: metric count (Nm.), 27/2; twist, 340Z+220S.

The yarn was arranged in hanks and these were then treated with boiling water in a dyeing vat and finally centrifuged and dried.

The hanks treated as above showed as shrinkage of 23%, and bulk. The mechanical characteristics of the yarn thus obtained were:

| Tenacity | gr./den | 1.3 |
| Elongation at break | percent | 45 |
| Elastic modulus | gr./den | 5.5 |
| Shrinkage in boiling water | percent | 0.3 |
| Shrinkage in tryelin | do | 0.1 |

EXAMPLE 3

Shrinkable polyvinylchloride tops of high syndiotactic index prepared by the process of Examples 1 or 2 are mixed with 30 to 60% of acrylic fiber tops having substantially no residual shrinkability, and the mixture is processed into high bulk yarn by the process of Examples 1 or 2.

Any of the fibers of polyvinylchloride of high syndiotactic index disclosed in our copending application Ser. No. 269,257 filed Apr. 1, 1963, may be used as the substantially nonshrinkable component of the yarns disclosed herein and after being given an additional stretch under the conditions disclosed herein may be used as the high residual shrinkage component of the yarn mixture. These textile fibers consist of at least 85% by weight of uncrosslinked polyvinylchloride having a mean molecular weight of from between 50,000 and 120,000 determined on the basis of intrinsic viscosity, a predominantly syndiotactic structure and a low degree of lateral branching and a D635 to D693 absorption ratio of from 1.8 to 3.0, as determined by infrared absorption analysis, and mechanical stability above its transition temperature; said textile fibers being further characterized by nonflammability; uniform cross-section and coloring; tensile strength of at least 2.5 grams per denier; elongation at break between 25 percent and 60 percent; a shrinkage in boiling water at maximum of about 1 percent; a shrinkage in trichloroethylene of less than 2% at 40° C.; and a flex-abrasion resistance in excess of 600 cycles with a weight corresponding to 0.05 gram per denier.

It is to be understood that various modifications will readily become apparent to those skilled in the art upon reading the foregoing description of the invention.

We claim:

1. A heat-shrunk and bulked textile yarn processed from a mixture of fibers of different shrinkability comprising
    (a) fibers of polyvinylchloride of a syndiotatic index greater than 2 having a residual shrinkability in boiling water or saturated steam of between about 10% and 30% of the original length and which after being shrunk in boiling water or saturated steam have a tenacity greater than 2.5 gr./den., an elongation at break between 30% and 55%, an elastic modulus between about 20 and 40 gr./den., and a shrinkage in trichloroethylene of less than 1% at 40° C., and
    (b) synthetic, artificial or natural fibers having substantially no residual shrinkability.

2. A high bulk yarn as defined in claim 1 wherein the polyvinylchloride fibers (a) having a residual shrinkability are present in a quantity between 10% and 70% by weight.

3. A high bulk yarn as defined in claim 1 wherein the polyvinylchloride fibers (a) having a residual shrinkability are present in a quantity between 30% and 60% by weight.

4. A high bulk yarn as defined in claim 2 wherein the fibers (b) having substantially no residual shrinkability are polyvinylchloride fibers of a syndiotactic index greater than 2 having a tenacity greater than about 2.5 gr./den., an elongation at break between about 25% and 60%, a boiling water shrinkage of at maximum about 1.0% and a shrinkage in trichloroethylene of less than 2% at 40° C.

5. A high bulk yarn as defined in claim 2 wherein the fibers (b) having substantially no residual shrinkability are acrylic fibers.

6. A high bulk yarn as defined in claim 2 wherein the fibers (a) of the mixture comprise crimped fibers.

7. A heat-shrunk and bulked textile yarn processed from a mixture of fibers of different shrinkability comprising
 (a) fibers of polyvinylchloride of a syndiotactic index greater than 2 having a residual shrinkability in boiling water or saturated steam of between about 10% and 30% of the original length and which after being shrunk in boiling water or saturated steam have a tenacity greater than 2.5 gr./den., an elongation at break between 30% and 55%, an elastic modulus between about 20 and 40 gr./den., and a shrinkage in trichloroethylene of less than 1% at 40° C., and
 (b) fibers having substantially no residual shrinkability which are polyvinylchloride fibers of a syndiotactic index greater than 2 having a tenacity greater than about 2.5 gr./den., an elongation at break between about 25% and 60%, a boiling water shrinkage at maximum about 1.0% and a shrinkage in trichloroethylene of less than 2% at 40° C.

8. A process for the production of a high bulk yarn comprising forming into tops a tow of fibers of polyvinylchloride having a syndiotactic index greater than 2, a residual shrinkability in boiling water or saturated steam of between about 10% and 30% of the original length and which after being shrunk in boiling water or saturated steam have a tenacity greater than 2.5 gr./den., an elongation at break between 30% and 55%, an elastic modulus between about 20 and 40 gr./den., and a shrinkage in trichloroethylene of less than 1% at 40° C., dividing the tops into two portions, relaxing one portion of said tops by treatment with a hot fluid, combining the relaxed portion of said tops with the other portion of said tops, converting the mixture into a yarn and shrinking the yarn.

9. The process of claim 8 wherein the relaxed portion of said tops comprises about 40 to 70% of the mixture.

References Cited

UNITED STATES PATENTS

| | | | |
|---|---|---|---|
| 2,610,359 | 4/1950 | Hatchard et al. | 264—185 |
| 2,810,281 | 10/1957 | Appleton et al. | |
| 2,985,940 | 5/1961 | Weldon. | |
| 3,146,574 | 9/1964 | Earnshaw | 57—140 |
| 3,236,825 | 2/1966 | Gord et al. | 264—210 XR |
| 3,327,037 | 6/1967 | Palvarini | 264—184 |
| 3,388,031 | 6/1968 | Mazzolini et al. | 264—210 |

STANLEY N. GILREATH, Primary Examiner

W. H. SCHROEDER, Assistant Examiner

U.S. Cl. X.R.

28—72; 57—157; 264—184, 210